(12) United States Patent
Murate

(10) Patent No.: US 9,282,481 B2
(45) Date of Patent: Mar. 8, 2016

(54) MOBILE TERMINAL AND INSTRUMENT DIAGNOSTIC METHOD

(71) Applicant: Azbil Corporation, Tokyo (JP)

(72) Inventor: Tsuneo Murate, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 0 days.

(21) Appl. No.: 14/496,232

(22) Filed: Sep. 25, 2014

(65) Prior Publication Data

US 2015/0087290 A1 Mar. 26, 2015

(30) Foreign Application Priority Data

Sep. 25, 2013 (JP) ................................. 2013-198531

(51) Int. Cl.
*H04W 24/08* (2009.01)
*G05B 19/418* (2006.01)

(52) U.S. Cl.
CPC ........... *H04W 24/08* (2013.01); *G05B 19/4184* (2013.01); *G05B 2219/33331* (2013.01); *G05B 2219/36167* (2013.01); *G05B 2219/36371* (2013.01)

(58) Field of Classification Search
CPC .............. H04W 24/08; G05B 19/4184; G05B 2219/36167; G05B 2219/33331; G05B 2219/36371
See application file for complete search history.

(56) References Cited

U.S. PATENT DOCUMENTS

| 7,571,071 | B2 * | 8/2009 | Shand ........................... 702/122 |
| 8,700,030 | B1 * | 4/2014 | Cole et al. ..................... 455/425 |
| 2007/0197206 | A1 * | 8/2007 | Olson et al. ................... 455/423 |
| 2008/0240051 | A1 * | 10/2008 | Nagy et al. ..................... 370/338 |
| 2010/0210254 | A1 * | 8/2010 | Kelly et al. .................... 455/418 |
| 2011/0072311 | A1 * | 3/2011 | Cho ................................. 714/44 |
| 2013/0267179 | A1 * | 10/2013 | Parekh et al. ............. 455/67.11 |
| 2015/0044975 | A1 * | 2/2015 | Lamb ........................ 455/67.14 |

FOREIGN PATENT DOCUMENTS

JP 2003-021555 1/2003

* cited by examiner

*Primary Examiner* — Nathan Mitchell
(74) *Attorney, Agent, or Firm* — Troutman Sanders LLP

(57) ABSTRACT

A mobile terminal includes an instrument specifying information acquiring portion that acquires instrument specifying information for specifying an instrument as a diagnostic subject, an equipment information acquiring portion that acquires, from a controlling device that controls equipment information pertaining to equipment that are provided with instruments, equipment information corresponding to the instrument specifying information, a diagnostic data acquiring portion that collects diagnostic data for the instrument using a data collecting device corresponding to a data categorization that is included in the equipment information acquired by the equipment information acquiring portion, an evaluating portion that evaluates whether or not there is a problem with the instrument by comparing proper-operation data for the instrument, included in the equipment information acquired by the equipment information acquiring portion, to the diagnostic data collected by the diagnostic data acquiring portion, and an outputting portion that outputs the evaluation result by the evaluating portions.

5 Claims, 2 Drawing Sheets

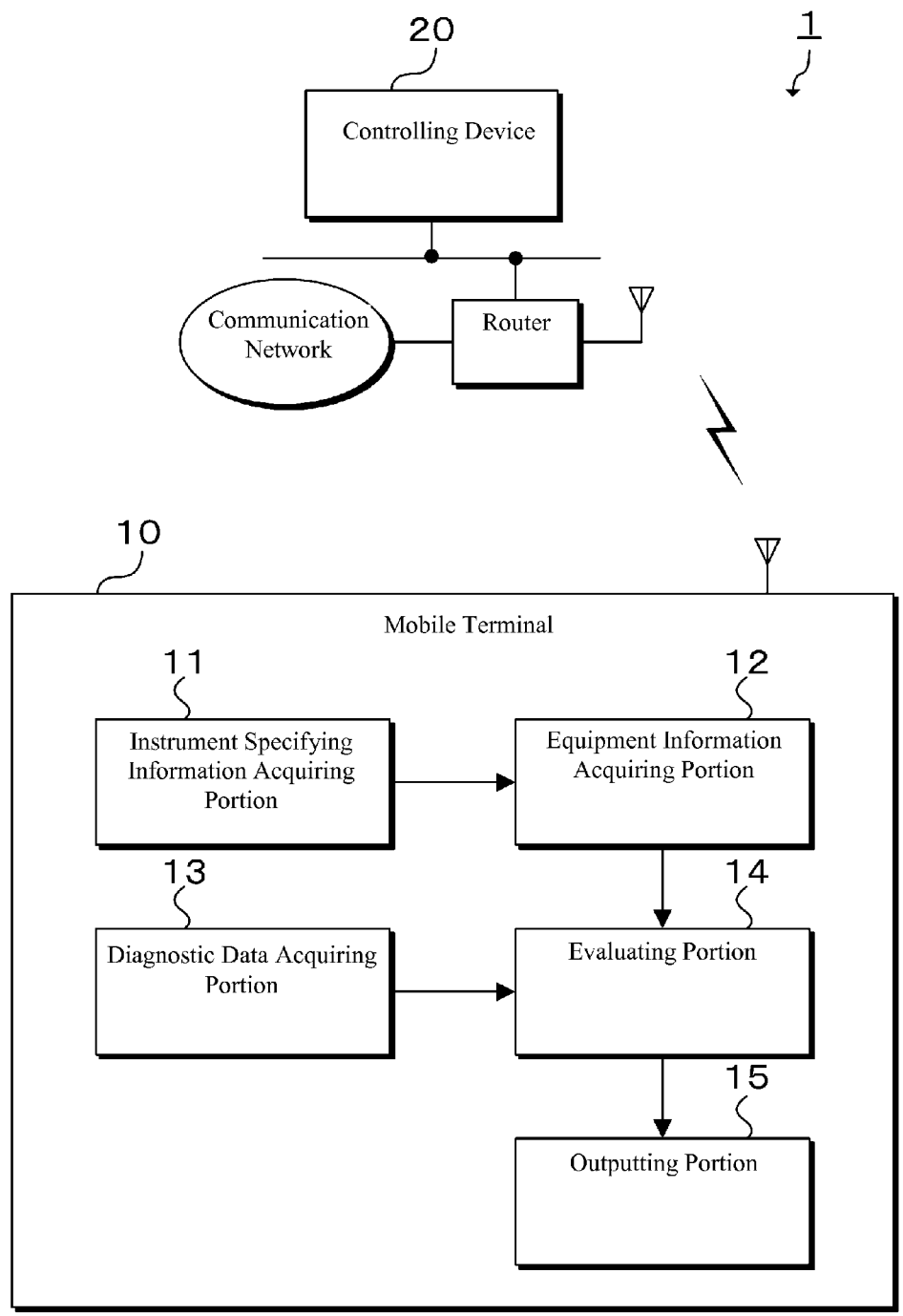

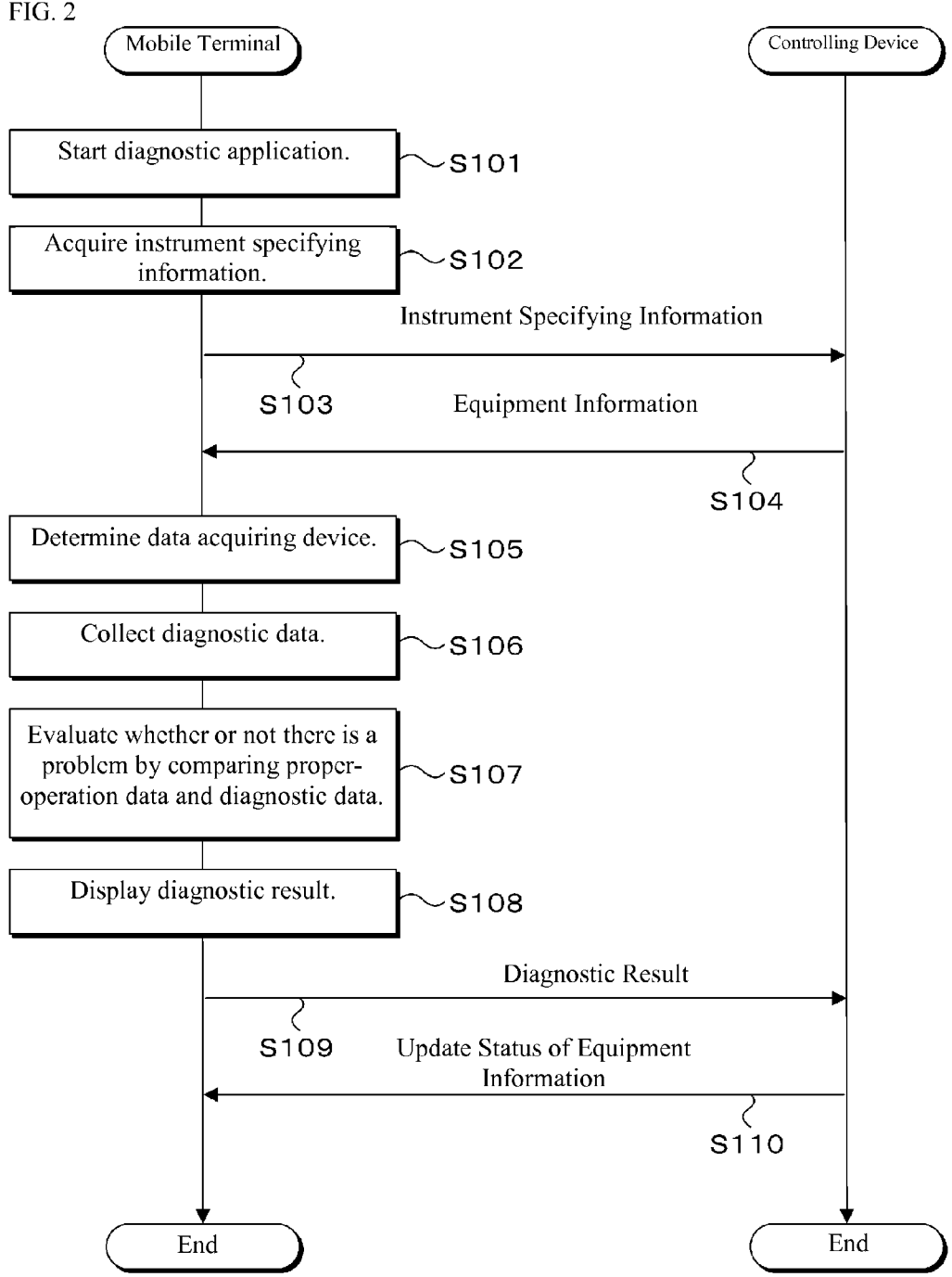

MOBILE TERMINAL AND INSTRUMENT DIAGNOSTIC METHOD

CROSS REFERENCE TO RELATED APPLICATION

This application claims priority under 35 U.S.C. §119 to Japanese Patent Application No. 2013-198531, filed on Sep. 25, 2013, the entire content of which being hereby incorporated herein by reference.

FIELD OF TECHNOLOGY

The present invention relates to a mobile terminal and instrument diagnostic method.

BACKGROUND

On work floors for controlling production processes there are a large number of instruments (such as sensor instruments and devices such as valve positioners) provided within the plant for controlling the processes. Maintaining the processes in the proper state presupposes that the instruments that are located within the plant are operating properly. Consequently, quick action must be taken if there is a problem with an instrument. For example, Japanese Unexamined Patent Application Publication No. 2003-21555 ("the JP '555") describes a problem monitoring device or monitoring the state of an instrument to evaluate whether or not there is a problem.

In the problem monitoring device set forth in the JP '555, above, monitoring whether or not there is a problem with an instrument is costly and time-consuming because it is necessary to set up a problem monitoring instrument, and to perform monitoring, for each individual instrument that is disposed on the workflow.

The present invention is to solve the problem with the conventional technology set forth above, and an aspect thereof is to provide a mobile terminal and instrument diagnostic method whereby it is possible to reduce the cost and time for monitoring whether or not there are problems with instruments.

SUMMARY

The mobile terminal relating to the present invention is a mobile terminal including: an instrument specifying information acquiring portion that acquires instrument specifying information for specifying an instrument to be a subject of diagnostics; an equipment information acquiring portion that acquires, from a controlling device that controls equipment information pertaining to equipment that are provided with instruments, the equipment information corresponding to the instrument specifying information acquired from the instrument specifying information acquiring portion; a diagnostic data acquiring portion that collects diagnostic data of the instrument using a data collecting device corresponding to a data categorization that is included in the equipment information acquired by the equipment information acquiring portion; an evaluating portion that compares proper-operation data that is collected when the instrument that is included in the equipment information that is acquired by the equipment information acquiring portion is operating properly, to the diagnostic data collected by the diagnostic data acquiring portion, and evaluates whether or not there is a problem in the instrument; and an outputting portion that outputs a result of the evaluation by the evaluating portion.

An instrument diagnostics method according to the present invention includes: a instrument specifying information acquiring step for acquiring instrument specifying information for specifying an instrument to be a subject of diagnostics; an equipment information acquiring step for acquiring, from a controlling device that controls equipment information pertaining to equipment that are provided with instruments, the equipment information corresponding to the instrument specifying information acquired in the instrument specifying information acquiring step; a diagnostic data acquiring step for collecting diagnostic data of the instrument using a data collecting device corresponding to a data categorization that is included in the equipment information acquired in the equipment information acquiring step; an evaluating step for comparing proper-operation data that is collected when the instrument that is included in the equipment information that is acquired by the equipment information acquiring step is operating properly, to the diagnostic data collected in the diagnostic data acquiring step, to evaluate whether or not there is a problem in the instrument; and an outputting step for outputting a result of the evaluation in the evaluating step.

The use of this structure makes it possible to acquire instrument specifying information for specifying an instrument for diagnostics and possible to acquire, from a controlling device, equipment information corresponding to the instrument specifying information, to collect diagnostic data for the instrument through the use of a data collecting device corresponding to the data categorization included in the acquired equipment information, to compare data for when the instrument is operating properly, included in the equipment information, to the diagnostic data that has been collected, to thereby evaluate whether or not there is a problem in the instrument, enabling outputting of the evaluation result.

The instrument specifying information may either be instrument specifying information for identifying the instrument, or position information indicating the position at which the instrument is installed. If the instrument specifying information is position information, then the equipment information acquiring portion may acquire the position indicated by the position information and equipment information corresponding to the equipment that is located in the vicinity of that position.

If there is a plurality of equipment information corresponding to the position information, then the equipment information acquiring portion prompts a user to select one of the plurality of equipment information, and then acquires the equipment information selected by the user.

If the discrepancy between the data for the proper operation and the diagnostic data is a value that indicates a problem, the evaluating portion may evaluate that there is a problem in the instrument.

The present invention enables the provision of a mobile terminal and an instrument diagnostics method able to reduce the time and cost when monitoring for whether or not there are problems with instruments.

BRIEF DESCRIPTIONS OF THE DRAWINGS

FIG. 1 is a diagram illustrating a structure of an instrument diagnostics system that includes a mobile terminal according to an example.

FIG. 2 is a flowchart for explaining the operation of an instrument diagnostics system that includes the mobile terminal of the example.

DETAILED DESCRIPTION

An example according to the present disclosure will be explained below in reference to the drawings. However, the example explained below is no more than an illustration, and does not exclude various modifications and applications to technologies not explicated below. That is, the present disclosure can be embodied in a variety of modified forms, in a scope that does not deviate from the spirit and intent thereof.

FIG. 1 is a diagram illustrating a schematic structure for an instrument diagnostics system that includes a mobile terminal according to an example according to the present invention. As illustrated in FIG. 1, an instrument diagnostics system 1 includes a mobile terminal 10 and a controlling device 20.

The controlling device 20 is a device for controlling instrument information relating to instruments that are disposed in the plant and equipment information regarding equipment that is provided in the plant. As instruments that are disposed within the plant there are instruments equipped with HART (Highway Addressable Remote Transducer) communication functions, and instruments that are compatible with Foundation™ Fieldbus (FF) technology. Specifically, various types of sensor instruments for detecting flow rates, pressures, temperatures, and the like and various types of actuators that run pumps, fans, and valve positioners for controlling various types of valves such as flow rate controlling valves, pressure controlling valves, and the like, are used as instruments.

As instrument information there is, for example, the instrument ID, for identifying an instrument, and various types of parameter values that are set in the instrument. As equipment information there are, for example, the equipment ID for identifying the equipment, instrument IDs for identifying instruments within the equipment, saved history data for the equipment, fault history data for the equipment, proper operation data from instrument diagnostics, data categorization for diagnostic data, and the like. The instrument information and equipment information is controlled through storing in a database (hereinafter termed "DB").

The mobile terminal 10 is a mobile terminal able to communicate with the controlling device 20, where a terminal that can be moved, such as a smart phone, a mobile telephone, a mobile information terminal, or the like, can be used for the mobile terminal 10. The mobile terminal 10 in the present example sends, to the controlling device 20, instrument specifying information for identifying the instrument that is the subject of the diagnostics, and acquires, from the controlling device 20, equipment information corresponding to the instrument specifying information, and also compares diagnostic data collected from the instrument that is the subject of the diagnostics to proper-operation data included in the equipment information acquired from the controlling device 20, to perform diagnostics as to whether or not there is a problem in the instrument that is the subject of the diagnostics. The proper-operation data is diagnostic data collected when the instrument that is the subject of the diagnostics is operating properly.

The diagnostic data is data that can be collected from the instrument that is subject to the diagnostics, data that can produce a discrepancy in the data content between times of proper instrument operation and times wherein there is an instrument problem. As diagnostic data there are data such as, for example, image data, video data, audio data, ultrasonic data, vibration data, thermal data, sound pressure data, and the like.

The functional structure of such a mobile terminal 10 will be explained below. As illustrated in FIG. 1, the mobile terminal 10, functionally, has an instrument specifying information acquiring portion 11, an equipment information acquiring portion 12, a diagnostic data acquiring portion 13, an evaluating portion 14, and an outputting portion 15.

The instrument specifying information acquiring portion 11 acquires, from the instrument, instrument specifying information for identifying the instrument, as instrument specifying information for specifying the instrument that is the subject of the diagnostics. In the present example, by way of illustration, a built-in AR marker, or a QR Code™, a barcode, or the like, is affixed to the instrument as the instrument specifying information. Through this, the instrument specifying information acquiring portion 11 is able to recognize an image that includes a camera-readable AR marker or QR Code™, barcode, or the like, read in by a camera that is provided in the mobile terminal 10, to acquire the instrument specifying information.

The equipment information acquiring portion 12 acquires, from the controlling device 20, equipment information corresponding to the instrument specifying information acquired by the instrument specifying information acquiring portion 11.

The diagnostic data acquiring portion 13 determines the data collecting device used when collecting the diagnostic data from the instrument that is the subject of the diagnostics, based on the data categorization of the diagnostic data included in the equipment information acquired by the equipment information acquiring portion 12. The diagnostic data acquiring portion 13 uses the data collecting device that has been determined, to collect diagnostic data from the instrument that is the subject of the diagnostics.

For the data categorization of the diagnostic data there is, for example, image data, video data, audio data, ultrasonic data, vibration data, thermal data, sound pressure data, and the like. For the data collecting device, the camera that is provided in a mobile terminal 10 can be used if the data categorization is image data or video data, or, if the data categorization is audio data, then a microphone that is provided in the mobile terminal 10 may be used. Moreover, if the data categorization is vibration data, then an acceleration sensor that is provided in the mobile terminal 10 may be used. Note that if the data collecting device is not provided in the mobile terminal 10, then the user is may be prompted to connect the data collecting device to the mobile terminal 10, depending on the data categorization, to collect the diagnostic data using the data collecting device that is connected to the mobile terminal 10.

The evaluating portion 14 compares the proper-operation data that is included in the equipment information, acquired by the equipment information acquiring portion 12, to the diagnostic data collected by the diagnostic data acquiring portion 13 to evaluate whether or not there is a problem with the instrument.

The evaluating portion 14 evaluates that there is a problem with the instrument if the discrepancy between the proper-operation data and the diagnostic data is a value that indicates a problem. The evaluation as to whether or not there is a problem in the instrument may be through evaluating as described below, for example. The similarity between the proper-operation data and the diagnostic data is calculated, and this calculated similarity is compared to a threshold value that serves as a reference when evaluating whether or not there is a problem, to evaluate whether or not there is a problem in the instrument.

By way of illustration, spectroscopic analysis of the acoustic vibration wave forms of the operating noise collected from the instrument may be performed, and the similarity between the peak for a specified frequency component at the time of proper operation and the peak for the specified frequency component during diagnostics may be calculated to evaluate whether or not there is a problem. Moreover, the similarity between a combination of the peaks for specified frequency components at the time of proper operation and a combination of the peaks for the specified frequency components during diagnostics may be calculated to evaluate whether or not there is a problem. In these cases, the evaluating portion 14 evaluates that there is no problem with the instrument when the similarity is greater than a threshold value that indicates proper operation and evaluates that there is a problem in the instrument into the similarity is less than a threshold value that indicates proper operation.

Moreover, an inverse filter of the acoustic vibration waveform of the operating noise from when operating properly may be applied to the acoustic vibration waveform of the operating noise at the time of the diagnostics to produce a residual signal, and the residual signal may be analyzed to evaluate whether or not there is an instrument problem. Furthermore, the statistical variability, from the time of proper operation, may be found through a plurality of residual signals found through applying some sort of inverse filter to a plurality of acoustic vibration wave forms, based on a plurality of acoustic vibration wave forms for the operating noise during proper operation, the statistical variability for during the diagnostics may be found through a plurality of residual signals found through applying, to a plurality of acoustic vibration wave forms of the operating noise at the time of diagnostics, an inverse filter for some sort of acoustic vibration waveform of the operating noise from during proper operation, and the evaluation of whether or not there is a problem with the instrument may be through testing (inference) using a technique such as an F-test or a t-test, for example, between the statistical variability from the time of proper operation and the statistical variability during the diagnostics.

The outputting portion 15 outputs the diagnostic result evaluated by the evaluating portion 14. The diagnostic result may be displayed on a display screen, or the like, of the mobile terminal 10 by displaying a graph of the diagnostic data, or may be outputted from a speaker, or the like, of the mobile terminal 10 through converting the diagnostic data into audio. The diagnostic result that is outputted may include the proper-operation data, in which case, a graph or audio of a comparison of the diagnostic data and proper-operation data may be outputted. Furthermore, the outputting portion 15 transmits, to be controlling device 20, the diagnostic result, including the identification of the instrument that is the subject of the diagnostics and the diagnostic data.

FIG. 2 will be referenced next to explain the operation of the instrument diagnostic system 1 that includes the mobile terminal 10 of the example.

First, the user operates the mobile terminal 10 to launch a diagnostic application (Step S101).

Following this, the instrument specifying information acquiring portion 11 of the mobile terminal 10 acquires the instrument specifying information for specifying the instrument that is the subject of the diagnostics through reading, through a camera, an AR marker, for example, that is attached to the instrument that is the subject of the diagnostics (Step S102).

Following this, the equipment information acquiring portion 12 of the mobile terminal 10 transmits, to the controlling device 20, the instrument specifying information acquired in Step S102 (Step S103), and requests the controlling device 20 to transmit, to the mobile terminal 10, the equipment information corresponding to the instrument specifying information.

Following this, the controlling device 20 retrieves, from a database, equipment information corresponding to the instrument specifying information that was sent from the mobile terminal 10, and transmits the extracted equipment information to the mobile terminal 10.

Following this, the diagnostic data acquiring portion 13 of the mobile terminal 10 selects a data collecting device based on the data categorization of the diagnostic data, included in the equipment information acquired from the controlling device 20 (Step S105).

Following this, the diagnostic data acquiring portion 13 of the mobile terminal 10 uses the data collecting device, determined in Step S105, to collect diagnostic data from the instrument that is the subject of the diagnostics (Step S103).

Following this, the evaluating portion 14 of the mobile terminal 10 evaluates whether or not there is a problem with the instrument by comparing the proper-operation data, included in the equipment information acquired from the controlling device 20, to the diagnostic data collected in Step S106 (Step S107).

Following this, the opening portion 15 of the mobile terminal 10 displays, on a displaying portion, the diagnostic result that includes the result of the evaluation in Step S107 (Step S108), and also transmits a diagnostic result, with the instrument identification, to the controlling device 20 (Step S109).

Following this, the controlling device 20, based on the diagnostic result sent from the mobile terminal 10, updates the equipment information that is stored in the database, and transmits, to the mobile terminal 10, the updated status, indicating the result of the updating (Step S110).

As described above, the instrument diagnostic system 1 that includes the mobile terminal 10 according to the example, having the instrument specifying information acquiring portion 11 enables acquisition, from the instrument that is the subject of the diagnostics, of the instrument specifying information for specifying the instrument that is the subject of the diagnostics, and having the equipment information acquiring portion 12 enables acquisition, from the controlling device 20, of the equipment information corresponding to the instrument specifying information acquired from the instrument, and having the diagnostic data acquiring portion 13 enables collection of the diagnostic data of the instrument using a data collecting device corresponding to the data categorization included in the equipment information acquired from the controlling device 20, and having the evaluating portion 14 enables evaluation of whether or not there is a problem with the instrument that is the subject of the diagnostics through comparing the proper-operation data for the instrument, included in the equipment information, to the diagnostic data that has been collected, while having the outputted portion 15 enables outputting of the evaluation result.

Consequently, the instrument diagnostic system that includes the mobile terminal 10 of the example enables a reduction in diagnostic costs and a reduction in time through enabling easy diagnostics as to whether or not there is a problem with an instrument that is disposed on the work floor of a factory, plant, or the like, through using data collecting functions of cameras, microphones, sensors, and the like, that are provided in a mobile terminal 10 that is possessed by a user.

In this way, the instrument diagnostic system 1 that includes the mobile terminal 10 according to the example is able to reduce costs and reduce time when monitoring whether or not there is a problem with an instrument.

Note that while, in the example set forth above, the instrument specifying information acquiring portion 11 acquired instrument specifying information as instrument specifying information, the instrument specifying information is not limited to instrument identifying information. For example, the instrument specifying information may instead be information that is able to specify an instrument, such as, for example, position information indicating the position in which an instrument is installed.

In this case, the instrument specifying information acquiring portion 11 may acquire, as the instrument specifying information, position information that includes the current location of the mobile terminal 10, which can be specified using a GPS function or map data that is provided in the mobile terminal 10. Furthermore, the equipment information acquiring portion 12 acquires, from the controlling device 20, equipment information pertaining to the equipment that is provided at the current location, indicated by the position information, and equipment that is installed in the vicinity of the current location (within a range of, for example, a radius of 10 m centered on the current location), as equipment information corresponding to the position information.

As the vicinity of the current location, the range may be set so as to reliably include the current location of the mobile terminal 10, in consideration of, for example, measurement error of the GPS function. Moreover, the equipment information acquiring portion 12, when there is a plurality of equipment information that can be acquired from the controlling device 20, may prompt the user to select one of the plurality of equipment information, to acquire, from the controlling device 20, the equipment information selected by the user.

The invention claimed is:

1. A mobile terminal comprising:
   an instrument specifying information acquirer acquiring instrument specifying information specifying an instrument to be a subject of diagnostics wherein the instrument specifying information indentifies the instrument to be the subject of diagnostics based on the position where the instrument to be the subject of diagnostics is installed;
   an equipment information acquirer acquiring from a controlling device that controls equipment information pertaining to equipment that are provided with instruments, the equipment information corresponding to the instrument specifying information acquired from the instrument specifying information acquirer;
   a diagnostic data acquirer collecting diagnostic data of the instrument using a data collecting device corresponding to a data categorization that is included in the equipment information acquired by the equipment information acquirer;
   an evaluator that compares data previously collected when the instrument to be the subject of diagnostics operated properly, to the diagnostic data collected by the diagnostic data acquirer and evaluates whether or not there is a problem in the instrument; and
   an outputting portion that outputs a result of the evaluation by the evaluator.

2. The mobile terminal as set forth in claim 1, wherein:
   the equipment information acquirer acquires the equipment information corresponding to the equipment installed at the position indicated by the position information and the equipment installed in the vicinity of that position, if the instrument specifying information is position information.

3. The mobile terminal as set forth in claim 2, wherein:
   the equipment information acquirer, if there is a plurality of equipment information corresponding to the position information, prompts a user to select one of the equipment information, and acquires the equipment information selected by the user.

4. The mobile terminal as set forth in claim 1, wherein:
   the evaluator determines that there is a problem with the instrument based on a discrepancy between the data previously collected when the instrument to be the subject of diagnostics operated properly and the diagnostic data has a value that indicates a problem.

5. An instrument diagnostics method, comprising:
   a instrument specifying information acquiring step acquiring instrument specifying information for specifying an instrument to be a subject of diagnostics wherein the instrument specifying information indentifies the instrument to be the subject of diagnostics based on the position where the instrument to be the subject of diagnostics is installed;
   an equipment information acquiring step acquiring, from a controlling device that controls equipment information pertaining to equipment that are provided with instruments, the equipment information corresponding to the instrument specifying information acquired in the instrument specifying information acquiring step;
   a diagnostic data acquiring step collecting diagnostic data of the instrument using a data collecting device corresponding to a data categorization that is included in the equipment information acquired in the equipment information acquiring step;
   an evaluating step comparing data previously collected when the instrument to be the subject of diagnostics operated properly to the diagnostic data collected in the diagnostic data acquiring step, to evaluate whether or not there is a problem in the instrument; and
   an outputting step outputting a result of the evaluation in the evaluating step.

* * * * *